3,301,696
PROCESS FOR THE IMPROVEMENT OF THE WASH-FASTNESS OF PRINTS ON CELLULOSE - CONTAINING MATERIALS WITH DYESTUFFS CONTAINING WATER-SOLUBILIZING GROUPS
Carl Taube, Leverkusen, and Klaus Böckmann, Cologne-Stammheim, Germany, assignors to Farbenfabriken Bayer Aktiengesellschaft, Leverkusen, Germany, a German corporation
No Drawing. Filed Nov. 28, 1962, Ser. No. 240,730
Claims priority, application Germany, Dec. 7, 1961, F 35,487
4 Claims. (Cl. 117—15)

The present invention relates to a process for the improvement of the wash-fastness of prints on cellulose-containing materials with dyestuffs containing water-solubilizing groups; more particularly the invention concerns a process which consists in treating the prints with a mixture of quaternary polyalkylene polyamines and hardenable preliminary resin products, and then subjecting the prints to temperatures of 100–180° C., preferably 130–160° C.

As quaternary polyalkylene polyamines there can be applied the quaternary polyalkylene polyamines which are known to be suitable for the after-treatment of direct dyeings on cellulose-containing materials, particularly the quaternary compounds obtainable by reacting ditertiary ethylene diamines with aliphatic dihalogen compounds according to U.S. Patent No. 3,009,761 and the quaternary compounds obtainable by the action of alkylating agents such as dimethyl sulfate on polyethylene polyamines prepared from ethylene imine, from ethylene chloride and ammonia, from chloroethylamine hydrochloride and sodium hydroxide, from 1-amino-3-halogeno-propane or from the sulfuric acid ester of 1-amino-3-hydroxy-propane according to British Patent No. 761,668 and German Patent No. 1,040,503.

As hardenable preliminary resin products there may be used for example dimethylol urea, dimethylol ethylene urea, dimethylol dihydroxyethylene urea, tetramethylol acetylene urea, hexamethylol melamine and pentaerithrityl-tetra-(N-methylol-methylcarbamate) as well as their alkyl ethers.

The relative amounts of quaternary polyalkylene polyamines and hardenable preliminary resin products such as a methylol compound of melamine can vary within wide limits. In general, it is recommended to use the hardenable preliminary resin products in excess, about three to five times their amount by weight.

With the aid of the process according to the invention it is possible to improve to an outstanding degree the wash fastness of prints with dyestuffs containing water-solubilizing groups, on materials of native and regenerated cellulose.

Dyestuffs containing water-solubilizing groups are substantive and acid dyestuffs such as are described in e.g. Fierz-David, Farbenchemie, 8th Edition (1952), pages 258–290, 294–301, 309–312 and 331.

As compared with the separate use of quaternary polyalkylene polyamines and hardenable preliminary resin products, the process of the present invention provides a surprising advance in the improvement of the wash-fastness of the prints.

The following examples serve to illustrate the invention without, however, limiting the scope thereof.

*Example 1*

A cotton fabric is printed with a paste produced from 25 g. of the dyestuff of Example 5 of U.S. Patent No. 3,037,013, 100 g. of urea, 30 g. of thiodiglycol, 10 g. of diethylene glycol, 400 g. of carboxy-methyl cellulose (8%) or 400 g. of sodium alginate (8%), 10 g. of m-nitrobenzene-sodium-sulfonate and 425 g. of boiling water. The printed fabric is dried, steamed for 20 minutes, washed for 20 minutes at 25 to 30° C. in an aqueous solution containing 2 g. soap per litre, then rinsed and again dried.

The printed fabric is then impregnated with an aqueous solution containing per litre 50 g. of dimethylol dihydroxyethylene urea, 10 g. of magnesium chloride and 20 g. of solution described below, which contains as quaternary polyalkylene polyamine the reaction product of 1,2-bis-(dimethyl-amino)-ethane with 1,4-dichlorobutane. The fabric is then squeezed off to a take up weight of about 80%, dried at 80–100° C. and heated to 100° C. for 5 minutes. The fabric is next soaped as usual for 30 minutes at 80° C., rinsed and dried. The wash fastness of the print thus treated is very good.

The solution containing the quaternary polyalkylene polyamine was prepared according to U.S. Patent No. 3,009,761 in the following manner:

A mixture of 11.6 g. of 1,2-bis-(dimethyl-amino)-ethane and 12.7 g. of 1,4-dichlorobutane was heated to 90–95° C., for about 40 hours. The reaction product thus formed was then dissolved in 50 millilitres of water and the solution was made up with water to a total weight of 140 g. after the addition of 30 g. of ammonium sulfate.

With the dyestuff according to Example 5 of U.S. Patent No. 3,037,013 a red print is obtained. If instead of this dyestuff the dyestuff of Example 1 of German Patent No. 1,028,716 or the dyestuff according to Colour Index, 2nd Edition, No. 42,660 is employed, a green or blue print is obtained; the after-treatment of these prints in the manner described leads to a wash fastness which is likewise very good.

*Example 2*

The procedure is carried out as described in Example 1, but with the difference that the solution with which the printed fabric is impregnated, contains per litre instead of 50 g. of dimethylol dihydroxyethylene urea, 50 g. of dimethylol ethylene urea or 50 g. of pentaerithrityl-tetra-(N-methylol-methylcarbamate). The wash fastness of the print thus treated is likewise very good.

*Example 3*

The procedure is carried out as described in Example 1 or 2, but with the difference that the solution with which the printed fabric is impregnated contains instead of 20 g. of the solution prepared according to U.S. Patent No. 3,009,761, 20 g. of a solution which was prepared according to German Patent No. 1,040,503 in the following manner:

26 g. 1-amino-3-chloropropane hydrochloride were added to 40 g. of 40% aqueous sodium hydroxide solution and stirred at room temperature for 24 hours. Then the solution from which sodium chloride had separated was heated for two hours to 35–40° C., for 2 hours to 60–65° C. and for 2 hours on the boiling water bath. Thereupon in the course of about 4 hours 55 g. of dimethyl sulfate were dropped into the solution which was always kept weakly alkaline by the addition of sodium hydroxide solution. Finally the neutral solution was made up with water to 185 g. and filtered.

We claim:

1. A process for improving the wash-fastness of dye prints on cellulose-containing materials wherein the dyes employed contain water-solubilizing groups, comprising treating the dye prints with an effective amount of a mixture containing, as active ingredient, a quaternary polyalkylene polyamine and a hardenable preliminary resin product selected from the class consisting of a methylol-urea, methylol-melamine, methylol-carbamate, and their alkyl ethers, and thereafter subjecting the print to a temperature of about 100–180° C.

2. A process according to claim 1 wherein the quaternary polyalkylene polyamine is a member selected from the group consisting of the reaction product of 1,2-bis-(dimethyl-amino)-ethane with 1,4-dichlorobutane, the reaction products of an alkylating agent and a polyethylene imine, and the reaction product of an alkylating agent and a polypropylene polyamine derived from 1-amino-3-halogeno-propane.

3. A process of claim 1 wherein the resin product is a member selected from the group consisting of a dimethylol urea, a dimethylol ethylene urea, dimethylol dihydroxyethylene urea, a tetramethylol acetylene urea, a hexamethylol melamine, a pentaerithrityl-tetra-(N-methylol-methyl carbamate) and the corresponding alkyl ethers.

4. A process of claim 1 wherein the dye print is subjected to a temperature of 130–160° C.

References Cited by the Examiner

UNITED STATES PATENTS

| | | | |
|---|---|---|---|
| 2,137,465 | 11/1938 | Thackston. | |
| 2,267,276 | 12/1941 | Hager | 117—62.1 |
| 3,009,761 | 11/1961 | Taube et al. | 260—567.6 |
| 3,116,263 | 12/1963 | Enders et al. | 117—143 |

FOREIGN PATENTS 396,736    8/1933    Great Britain.

OTHER REFERENCES

"Textile Colorist," vol. 59, No. 702, June 1937 (pp. 371–372).

RALPH S. KENDALL, *Primary Examiner.*

RICHARD D. NEVIUS, ALFRED LEAVITT,
                                        *Examiners.*

K. G. WHEELESS, A. H. ROSENSTEIN,
                                    *Assistant Examiners.*